United States Patent
Kamiya

(10) Patent No.: US 10,282,400 B2
(45) Date of Patent: May 7, 2019

(54) GRAMMAR GENERATION FOR SIMPLE DATATYPES

(71) Applicant: FUJITSU LIMITED, Kawasaki-shi, Kanagawa (JP)

(72) Inventor: Takuki Kamiya, Palo Alto, CA (US)

(73) Assignee: FUJITSU LIMITED, Kawasaki (JP)

( * ) Notice: Subject to any disclaimer, the term of this patent is extended or adjusted under 35 U.S.C. 154(b) by 733 days.

(21) Appl. No.: 14/639,852

(22) Filed: Mar. 5, 2015

(65) Prior Publication Data

US 2016/0259764 A1    Sep. 8, 2016

(51) Int. Cl.
*G06F 17/00* (2006.01)
*G06F 17/22* (2006.01)
*G06F 17/21* (2006.01)

(52) U.S. Cl.
CPC ........ *G06F 17/2252* (2013.01); *G06F 17/218* (2013.01)

(58) Field of Classification Search
CPC ................... G06F 17/2252; G06F 17/2247
See application file for complete search history.

(56) References Cited

U.S. PATENT DOCUMENTS

| | | | | |
|---|---|---|---|---|
| 7,292,160 B1 * | 11/2007 | Wang | ........... | H03M 7/30 341/51 |
| 7,565,339 B2 * | 7/2009 | Schneider | ........... | G06N 5/02 706/47 |
| 7,853,724 B2 * | 12/2010 | Schneider | ........... | G06F 9/541 707/601 |
| 8,120,515 B2 * | 2/2012 | Schneider | ........... | H03M 7/30 341/50 |
| 8,250,465 B2 * | 8/2012 | Uchida | ........... | G06F 17/2258 341/106 |
| 8,341,129 B2 * | 12/2012 | Denoual | ........... | G06F 17/2258 707/693 |
| 8,364,621 B2 * | 1/2013 | Fablet | ........... | G06F 17/2247 706/21 |
| 8,464,231 B2 * | 6/2013 | Bellessort | ........... | H03M 7/30 717/142 |
| 8,601,368 B2 * | 12/2013 | Fablet | ........... | G06F 17/2247 715/234 |
| 8,627,200 B2 * | 1/2014 | Bellessort | ........... | G06F 17/2247 715/234 |

(Continued)

OTHER PUBLICATIONS

Rumen Kyusakov et. al., "Efficient XML Interchange in Factory Automation Systems", IECON 2011—37th Annual Conference on IEEE Industrial Electronics Society, Nov. 7-10, 2011, pp. 4478-4483.*

(Continued)

*Primary Examiner* — Scott T Baderman
*Assistant Examiner* — Benjamin Smith
(74) *Attorney, Agent, or Firm* — Maschoff Brennan

(57) ABSTRACT

A method may include receiving an extensible markup language schema definition (XSD) including a first element having a first simple datatype and a second element having a second simple datatype different from the first simple datatype. A grammar may be generated based on the XSD. The grammar may be associated with encoding and decoding an extensible markup language (XML) document based on the XSD to and from efficient XML interchange (EXI) streams. The grammar may be associated with the first simple datatype and with the second simple datatype.

9 Claims, 4 Drawing Sheets

(56) References Cited

U.S. PATENT DOCUMENTS

| | | | | |
|---|---|---|---|---|
| 8,698,657 | B2* | 4/2014 | Fablet | H03M 7/3086 341/106 |
| 8,700,680 | B2* | 4/2014 | Doi | G06F 17/2247 707/804 |
| 8,788,934 | B2* | 7/2014 | Doi | G06F 17/2252 715/234 |
| 8,849,726 | B2* | 9/2014 | Ishizaki | G06F 17/2247 706/12 |
| 8,850,309 | B2* | 9/2014 | Fablet | G06F 17/2247 715/234 |
| 8,862,531 | B2* | 10/2014 | Schneider | G06N 5/02 706/47 |
| 8,892,991 | B2* | 11/2014 | Doi | G06F 17/272 715/234 |
| 8,897,741 | B2* | 11/2014 | Johnson | H04W 4/02 455/404.2 |
| 8,914,718 | B2* | 12/2014 | Denoual | G06F 17/2258 341/106 |
| 8,930,924 | B2* | 1/2015 | Fablet | G06F 17/2252 717/146 |
| 8,949,207 | B2* | 2/2015 | Fablet | G06F 9/505 707/693 |
| 8,954,457 | B2* | 2/2015 | Fablet | G06F 17/2247 707/757 |
| 9,069,734 | B2* | 6/2015 | Bellessort | G06F 17/2258 |
| 9,208,256 | B2* | 12/2015 | Fablet | G06F 17/30917 |
| 2002/0077823 | A1* | 6/2002 | Fox | G06F 8/34 704/260 |
| 2004/0225754 | A1* | 11/2004 | Lee | H03M 7/30 709/247 |
| 2007/0150494 | A1* | 6/2007 | Harrington | G06F 17/2247 |
| 2007/0239393 | A1* | 10/2007 | Schneider | G06N 5/02 702/127 |
| 2007/0239881 | A1* | 10/2007 | Schneider | H03M 7/30 709/231 |
| 2008/0082556 | A1* | 4/2008 | Schneider | H03M 7/30 |
| 2009/0183067 | A1* | 7/2009 | Fablet | G06F 17/2247 715/234 |
| 2009/0210783 | A1* | 8/2009 | Bellessort | G06F 17/2247 715/234 |
| 2009/0287625 | A1* | 11/2009 | Fablet | G06F 17/2247 706/45 |
| 2009/0319594 | A1* | 12/2009 | Schneider | G06F 9/541 709/201 |
| 2010/0010995 | A1* | 1/2010 | Fablet | H03M 7/30 706/46 |
| 2010/0023470 | A1* | 1/2010 | Schneider | G06N 5/02 706/47 |
| 2010/0083101 | A1* | 4/2010 | Denoual | G06F 17/2247 715/242 |
| 2010/0107052 | A1* | 4/2010 | Uchida | G06F 17/2247 715/234 |
| 2010/0153837 | A1* | 6/2010 | Bellessort | G06F 17/2247 715/234 |
| 2010/0192056 | A1* | 7/2010 | Bellessort | G06F 17/2247 715/237 |
| 2010/0287460 | A1* | 11/2010 | Denoual | G06F 17/2247 715/234 |
| 2010/0322527 | A1* | 12/2010 | Fablet | G06F 17/2252 382/232 |
| 2011/0010614 | A1* | 1/2011 | Fablet | G06F 17/2229 715/234 |
| 2011/0047230 | A1* | 2/2011 | McGee | H04L 41/0609 709/206 |
| 2011/0153531 | A1* | 6/2011 | Ishizaki | G06F 17/2247 706/12 |
| 2012/0150828 | A1* | 6/2012 | Fablet | G06F 9/505 707/693 |
| 2012/0254231 | A1* | 10/2012 | Doi | G06F 17/2264 707/769 |
| 2012/0254724 | A1* | 10/2012 | Doi | G06F 17/272 715/234 |
| 2012/0254725 | A1* | 10/2012 | Doi | G06F 17/2252 715/234 |
| 2012/0330984 | A1* | 12/2012 | Fablet | G06F 17/2247 707/755 |
| 2013/0086016 | A1* | 4/2013 | Schneider | G06F 9/541 707/695 |
| 2013/0103721 | A1* | 4/2013 | Doi | G06F 17/30914 707/802 |
| 2013/0104033 | A1* | 4/2013 | Doi | G06F 17/2247 715/234 |
| 2013/0337789 | A1* | 12/2013 | Johnson | H04W 4/02 455/414.1 |
| 2013/0337836 | A1* | 12/2013 | Johnson | H04W 4/02 455/456.2 |
| 2014/0070966 | A1* | 3/2014 | Fablet | H03M 7/3086 341/55 |
| 2014/0082481 | A1* | 3/2014 | Doi | G06F 17/2247 715/234 |
| 2014/0297692 | A1* | 10/2014 | Doi | G06F 17/3092 707/803 |
| 2014/0372868 | A1 | 12/2014 | Kamiya | |
| 2015/0128114 | A1* | 5/2015 | O'Hara | G06F 8/71 717/143 |
| 2016/0026326 | A1* | 1/2016 | Wu | G06F 3/04883 345/173 |
| 2016/0259763 | A1* | 9/2016 | Kamiya | G06F 17/227 |
| 2016/0259764 | A1* | 9/2016 | Kamiya | G06F 17/218 |

OTHER PUBLICATIONS

European Office Action for corresponding application No. 16153246.0, dated Sep. 12, 2017 , 4 pages.

EXIficient processor. See http://exificient.sourceforge.net | Relevant pp. 1-2.

Kamiya, Taki, Re: [LC-2363] xsi:type feature simplificaiton, xsi public comments mailing list, Aug. 27, 2010, retrieved Jul. 6, 2016 from URL: http://lists.w3.org/Archives/Public/public-exi-comments/2010Aug/0001.html | Relevant pp. 1-3.

Kyusakov, Rumen et al., EXIP: A Framework for Embedded Web Development, ACM Transactions on the Web (TWEB), vol. 8, No. 4, Article 23, Nov. 6, 2014, pp. 1-29 | Relevant pp. 1, 5-10.

Schneider, John et al., Efficient XML Interchange (EXI) Format 1.0 (Second Edition) Feb. 14, 2014, retrieved Oct. 14, 2015 from URL: http://www.w3.org/TR/exi/ | Relevant pp. 1, 8-10, and 48.

European Search Report for corresponding application No. 16153246.0, dated Jul. 13, 2016 | Relevant pp. 4-7.

\* cited by examiner

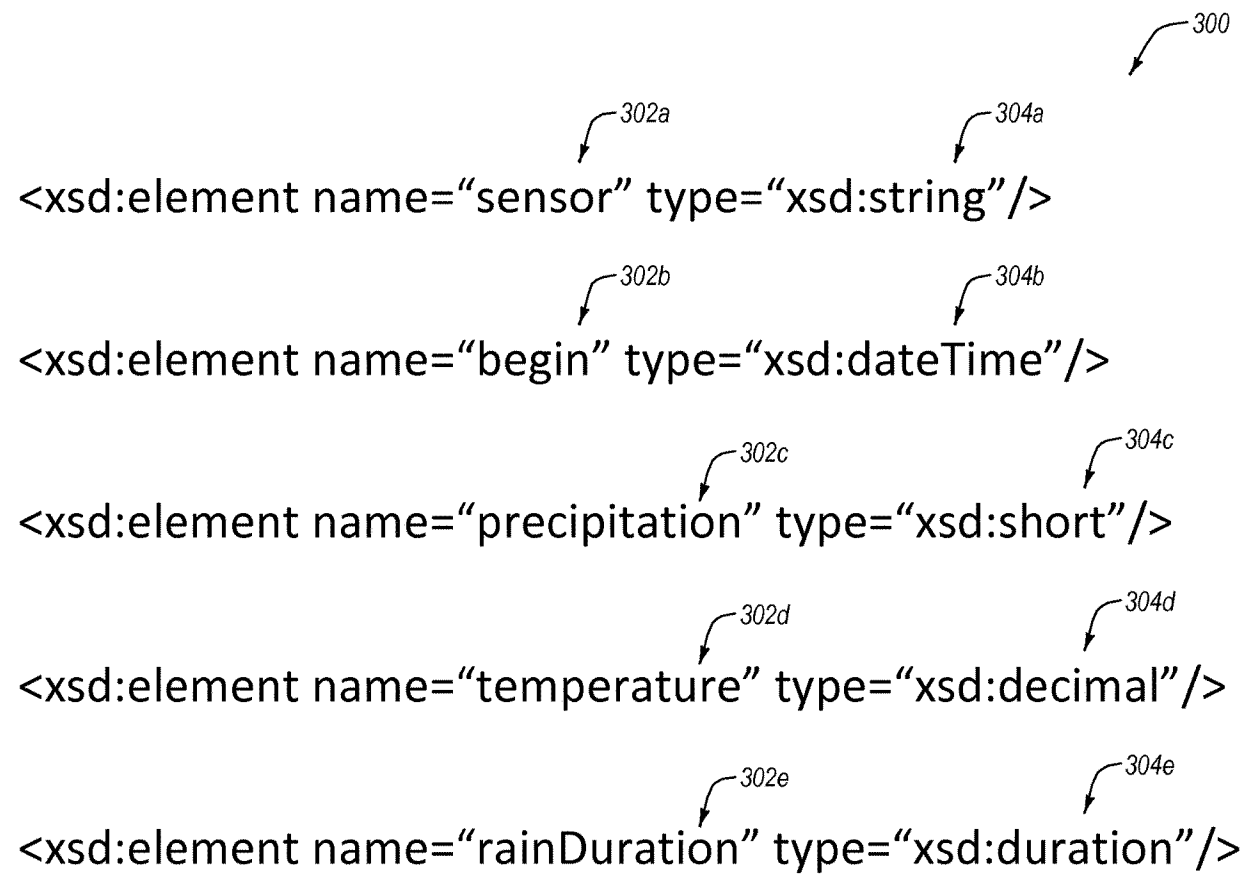

300

302a `<xsd:element name="sensor" type="xsd:string"/>` 304a

302b `<xsd:element name="begin" type="xsd:dateTime"/>` 304b

302c `<xsd:element name="precipitation" type="xsd:short"/>` 304c

302d `<xsd:element name="temperature" type="xsd:decimal"/>` 304d

302e `<xsd:element name="rainDuration" type="xsd:duration"/>` 304e

*Fig. 3*

GRAMMAR GENERATION FOR SIMPLE DATATYPES

FIELD

The embodiments discussed herein are related to grammar generation for simple datatypes.

BACKGROUND

Extensible markup language (XML) is a markup language that defines a set of rules for encoding documents in a plain-text format that is both human-readable and machine-readable. One version of XML is defined in the XML 1.0 Specification produced by the World Wide Web Consortium (W3C) and dated Nov. 26, 2008, which is incorporated herein by reference in its entirety. The XML 1.0 Specification defines an XML document as a text that is well-formed and valid.

An XML schema is a description of a type of XML document, typically expressed in terms of constraints on the structure and content of documents of that type, above and beyond the basic syntactical constraints imposed by the XML 1.0 Specification itself. These constraints are generally expressed using some combination of rules governing the order of elements, boolean predicates associated with the content, data types governing the content of elements and attributes, and more specialized rules such as uniqueness and referential integrity constraints.

The process of checking to see if an XML document conforms to an XML schema is called validation, which is separate from XML's concept of syntactic well-formedness. All XML documents may be well-formed, but an XML document may be checked for validity, where the XML document is checked for conformance with its associated schema.

Although the plain-text, human-readable aspect of XML documents may be beneficial in many situations, this human-readable aspect may also lead to XML documents that are large in size and therefore incompatible with devices with limited memory or storage capacity. Efforts to reduce the size of XML documents have often eliminated this plain-text, human-readable aspect in favor of more compact documents.

Efficient XML interchange (EXI) is a binary XML format in which XML documents are encoded in a binary data format rather than plain text. In general, using an EXI format reduces the size and verbosity of XML documents, and may reduce the time and effort expended to parse XML documents. A formal definition of EXI is described in the EXI Format 1.0 Specification produced by the W3C and dated Feb. 11, 2014, which is incorporated herein by reference in its entirety. An XML document may be encoded in an EXI format as an EXI stream. Additionally, the EXI stream may be decoded to form an XML document similar to or the same as the original XML document.

An XML document or set of XML documents may include an associated XML schema definition (XSD). The XSD may generally describe the XML schema associated with an XML document.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method may include receiving an extensible markup language schema definition (XSD) including a first element having a first simple datatype and a second element having a second simple datatype different from the first simple datatype. A grammar may be generated based on the XSD. The grammar may be associated with encoding and decoding an extensible markup language (XML) document based on the XSD to and from efficient XML interchange (EXI) streams. The grammar may be associated with the first simple datatype and with the second simple datatype.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 3 illustrates a portion of an example XSD; and

DESCRIPTION OF EMBODIMENTS

Prior to encoding an XML document into an EXI stream or decoding an EXI stream into an XML document, the document's associated XSD may be normalized into grammars. The grammars are rules that may be used to predict specific sequences of the XML document. An algorithm to generate the grammars for an XSD is included in the EXI Format 1.0 Specification. As used herein the algorithm included in the EXI Format 1.0 Specification is referred to herein as the standard grammar algorithm.

Embodiments of the present invention will be explained with reference to the accompanying drawings.

Figure 1:
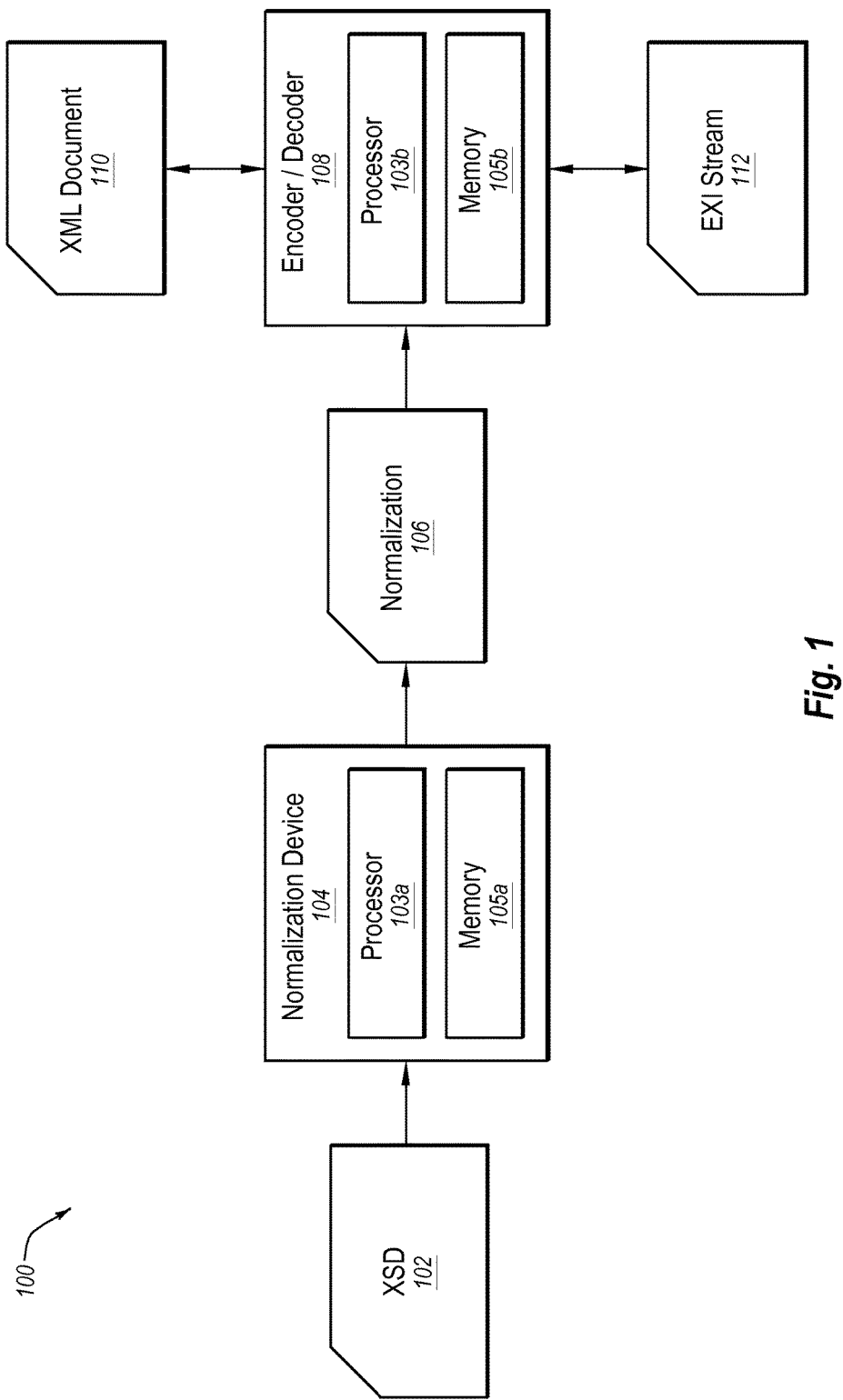
FIG. 1 is a block diagram of an example efficient extensible markup language interchange (EXI) processing system.

FIG. 1 is a block diagram of an example extensible markup language interchange (EXI) processing system 100. The EXI processing system 100 includes a normalization device 104. The normalization device 104 may be configured to receive an extensible markup language schema definition (XSD) 102 and to output a normalization 106. The normalization 106 of the XSD may be used, for example, in encoding and/or decoding an EXI document.

The normalization device 104 may include one or more embodiments of a grammar-generating algorithm as disclosed herein. In some embodiments, the normalization 106 may include a single grammar for use with multiple simple datatypes as disclosed herein.

The normalization 106 may be communicated to an encoder/decoder 108. An example encoder/decoder 108 is included in the OpenEXI project hosted at SourceForge.net. The source code and documentation of the OpenEXI project as of Jul. 28, 2014 are incorporated herein by reference in their entirety. The encoder/decoder 108 may be configured to receive an extensible markup language (XML) document 110 and to encode the XML document 110 as an EXI stream 112. Alternately or additionally, the EXI stream 112 may also be received by the encoder/decoder 108 and decoded as the XML document 110. An original XML document 110 and the XML document 110 generated by the encoder/decoder 108 may include substantially identical XML data. However, certain types of human-readable information, such as whitespace, comments, and/or processing instructions, may not be preserved by the encoder/decoder 108 depending on associated preservation settings of the encoder/decoder 108.

The normalization device 104 may include a processor 103a and memory 105a. The encoder/decoder 108 may include a processor 103b and memory 105b. The memory 105a and the memory 105b may include non-transitory computer-readable media. Instructions such as programming code executable by the processor 103a and the processor 103b may be encoded in the memory 105a and the memory 105b, respectively. When the instructions are executed by the processor 103a and/or the processor 103b, the normalization device 104 and/or the encoder/decoder 108 may perform operations related to and/or including the processes described herein.

The normalization device 104 and/or the encoder/decoder 108 may be employed in an embedded device and/or a device with limited memory capacity. Examples of embedded devices and/or devices with limited memory capacity include, but are not limited to, sensors, microcontrollers, and appliances, such as energy management controllers, automobile microcontrollers, smart meters, or the like.

Figure 2:
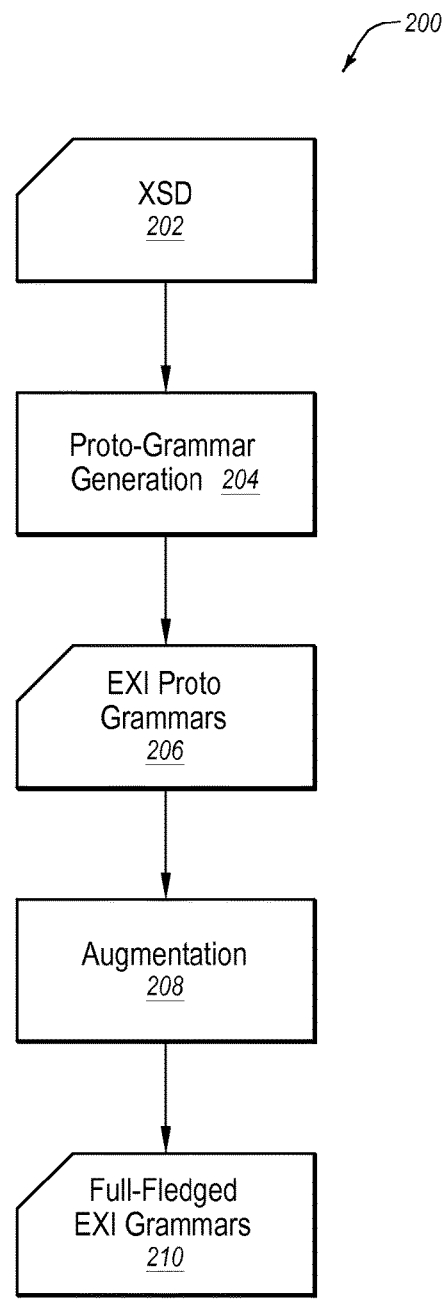
FIG. 2 is a flowchart of an example process of generating full-fledged EXI grammars from an extensible markup language schema definition (XSD)

FIG. 2 is a flowchart of an example process 200 of generating full-fledged EXI grammars 210 from an XSD 202. In some embodiments, the process 200 may be performed by the normalization device 104 of FIG. 1.

The process 200 may begin with the XSD 202. A set of EXI proto-grammars 206 may be generated from the XSD 202 at block 204. One or more of the embodiments described herein may occur at block 204.

In some embodiments, proto-grammar generation 204 may correspond to section 8.5.4.1 of the EXI Format 1.0 Specification without the current version of section 8.5.4.1.3.1. In some embodiments, section 8.5.4.1.3.1 may be replaced with one or more of the embodiments described herein.

Syntax described in the current version of section 8.5.4.1.3.1 of the EXI Format 1.0 Specification includes the following:

$Type_{i,0}$:
   CH [schema-typed value] $Type_{i,1}$
$Type_{i,1}$:
   EE where CH may represent a character event, EE may represent an end element event, and i may represent each value between 0 and n, where n may be the number of simple datatypes. Thus, using the syntax described in the current version, a different grammar may conventionally be used for each simple datatype.

As described herein, in some embodiments, a single grammar may be used for multiple different simple datatypes. Using a single grammar for multiple different simple datatypes may promote a compact set of grammars. For example, a single grammar may be used for all simple datatypes in an XML document. More compact sets of grammars may employ relatively fewer resources to store and/or communicate, and thus may lend themselves to deployment in low-memory devices such as sensors and microcontrollers.

By way of example, the foregoing portion of the current version of section 8.5.4.1.3.1 may be replaced with the following:

$Type_0$:
   CH [schema-typed value] $Type_1$
$Type_1$:
   EE where i from the current version may be omitted.

In some instances, the EXI proto-grammars 206 may be augmented at block 208, forming the full-fledged EXI grammars 210. Augmenting the EXI proto-grammar 206 may include inserting additional attributes, properties, or the like.

FIG. 3 illustrates a portion of an example XSD 300. The XSD 300 may include elements 302a-302e (collectively "elements 302") that each has a simple datatype 304a-304e (collectively "simple datatypes 304"). The simple datatypes 304 may be defined by an EXI specification, an XML schema specification, and/or may be user-defined. The simple datatypes 304 may be associated with one or more acceptable formats and/or values for characters associated with corresponding elements 302.

Figure 4:
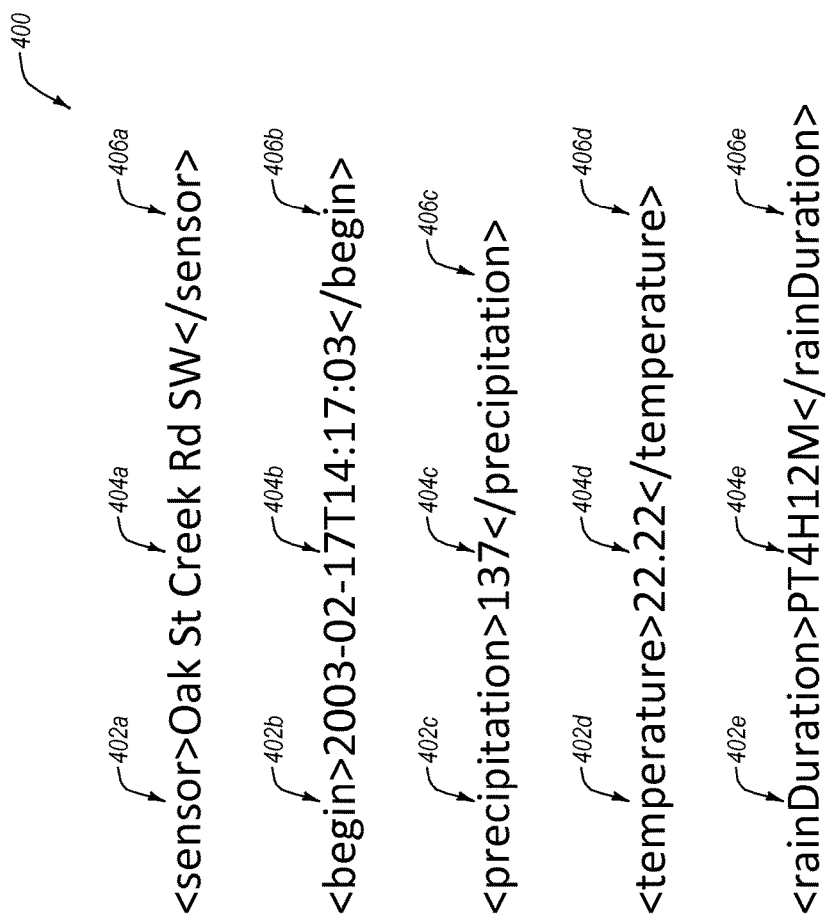
FIG. 4 illustrates a portion of an example extensible markup language (XML) document based on the XSD of FIG. 3.

FIG. 4 illustrates a portion of an example extensible markup language (XML) document 400 based on the XSD 300 of FIG. 3. The XML document 400 includes start elements 402a-402e (collectively "start elements 402"), each followed by characters 404a-404e (collectively "characters 404"), and end elements 406a-406e (collectively "end elements 406").

In the EXI Format 1.0 Standard, each of the characters 404 is encoded according to a particular grammar associated with the corresponding simple datatypes 304. Thus, conventionally, a different grammar may be used for each different simple datatype in the XSD. For example, an XSD may include 45 built-in simple datatypes, as well as additional user-defined simple datatypes.

For each simple datatype grammar used in an EXI stream, the following first state and second state may be created.

First State:

```
<Grammar>
    <Productions>
        <CharactersTyped/>
        <Grammar>1</Grammar>
    </Productions>
</Grammar>
```

Second State:

```
<Grammar>
    <Productions>
        <EndElement/>
    </Productions>
</Grammar>
```

Each grammar definition may use a number of bytes. By way of example, the above first state and second state may occupy 143 bytes. If a different grammar is used for each simple datatype, the total bytes occupied by the definition of all grammars may be given by the following formula:

$$\text{total size} = (x+\alpha)(y+n)$$

where x represents the number of bytes to define the grammar, α represents the number of bytes used for identifying simple datatypes, y represents the number of built-in simple datatypes, and n represents the number of user-defined simple datatypes. Where x is 143 and y is 45, the grammar definitions may take up at least 6435 bytes of space.

However, in embodiments where a single grammar is used for multiple simple datatypes, the simple datatype grammar definitions may take up less space. For example, where 143 bytes are used to define a grammar, the simple datatype grammar definitions may take up 143 bytes of space if a single simple datatype grammar is used for each of the simple datatypes.

In some embodiments, a single grammar to be used for multiple different simple datatypes may be selected based on a simple datatype of the XML schema. For example, the grammar may be selected based on a first simple datatype encountered during proto-grammar generation. Alternately, a grammar may be selected independent of the XML schema. For example, a single grammar may be preselected and used for multiple simple datatypes irrespective of the simple datatypes of the XML schema.

In some embodiments, an XML document such as the XML document 400 of FIG. 4 may be encoded as an EXI stream. The XML document may be based on an XSD such as the XSD 300 of FIG. 3. An associated normalization may include a single grammar for multiple different simple datatypes and potentially all simple datatypes. For example, with combined reference to FIG. 3 and FIG. 4, a single grammar may be employed to encode a sensor element 302a characters 404a having a string simple datatype 304a, a begin element 302b characters 404b having a dateTime simple datatype 304b, a precipitation element 302c characters 404c having a short simple datatype 304c, and so on. Thus, "Oak St Creek Rd SW," "2003-02-17T14:17:03," "137," "22.22," and "PT4H12M" of the characters 404 may be encoded according to a single grammar.

In some embodiments, encoding the XML document 400 as the EXI stream may further include adding event type identifiers to a stack. Each of the event type identifiers may be associated with an element and its associated characters. For example, an event type identifier represented by the bit sequence "001" may be associated with the sensor element 302a and may be added to a stack of event types such that the "001" event type identifier is associated with the encoded characters of the EXI stream that represent "Oak St Creek Rd SW" characters 404a. An event type identifier represented by the bit sequence "010" may be associated with the begin element 302b and may be added to the stack such that the "010" event type identifier is associated with the encoded characters that represent "2003-02-17T14:17:03" characters 404b. Additional event type identifiers, such as additional bit sequences, may be associated with the other elements 302 and the encoded characters representing their associated characters 404.

In some embodiments, the event type identifiers may be pulled from the stack, or decoded, as the EXI stream is decoded. Optionally, the event type identifiers may be decoded in an order reversed from the order the event type identifiers were added to the stack. The event type identifiers may be used to identify and/or call codecs for use in interpreting the encoded characters associated with the event type identifiers. For example, a decoder may pull the bit sequence "010" from the stack and call a codec for interpreting the encoded dateTime characters "2003-02-17T14:17:03," which were encoded according to the grammar used for all simple datatypes. The decoder may then pull the bit sequence "001" from the stack and may call a codec for interpreting encoded string characters "Oak St Creek Rd SW," which were encoded according to the grammar used for all simple datatypes.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media.

Computer-executable instructions may include, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general-purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method comprising:
receiving an extensible markup language schema definition (XSD) including a first element having a first simple datatype and a second element having a second simple datatype different from the first simple datatype;
generating a grammar based on the XSD, the grammar associated with encoding and decoding an extensible markup language (XML) document based on the XSD to and from efficient XML interchange (EXI) streams, the grammar being associated with the first simple datatype and with the second simple datatype based on the first simple datatype and the second simple datatype both being simple datatypes, the grammar being associated with the first simple datatype and with the second simple datatype using fewer resources than having separate grammars for each of the first simple datatype and the second simple datatype;
generating a normalization associated with the XSD, the normalization including the grammar;
receiving the XML document based on the XSD, the XML document including:
first characters associated with the first element and the first simple datatype; and
second characters associated with the second element and the second simple datatype; and
encoding the XML document as an EXI stream, including:
encoding the first characters according to the grammar of the normalization in which the grammar of the normalization is associated with all simple datatypes of the XSD;
adding a first event type identifier to a stack of the EXI stream such that the first event type identifier is associated with the encoded first characters; and
encoding the second characters according to the grammar.

2. The method of claim 1, wherein the grammar is further generated based on the first simple datatype.

3. The method of claim 1, wherein the grammar is independent of the first simple datatype and the second simple datatype.

4. The method of claim 1, wherein:
the XSD further includes a third element having a third simple datatype different from the first simple datatype and different from the third simple datatype; and
the grammar is further associated with the third simple datatype.

5. The method of claim 1, wherein the grammar is the only grammar associated with any simple datatype of the XSD.

6. The method of claim 1, wherein the first event type identifier is associated with the first element and with the first simple datatype.

7. The method of claim 6, further comprising adding a second event type identifier to the stack such that the second event type identifier is associated with the encoded second characters, wherein the second event type identifier is associated with the second element and with the second simple datatype.

8. The method of claim 1, wherein:
the XSD further includes a third element having a third simple datatype different from the first simple datatype and different from the second simple datatype;
the XML document further includes third characters associated with the third element and the third simple datatype; and
encoding the XML document as the EXI stream further includes encoding the third characters according to the grammar.

9. The method of claim 8, further comprising:
adding a first event type identifier to a stack of the EXI stream such that the first event type identifier is associated with the encoded first characters, wherein the first event type identifier is associated with the first element and with the first simple datatype;
adding a second event type identifier to the stack such that the second event type identifier is associated with the encoded second characters, wherein the second event type identifier is associated with the second element and with the second simple datatype; and
adding a third event type identifier to the stack such that the third event type identifier is associated with the encoded third characters, wherein the third event type identifier is associated with the third element and with the third simple datatype.

* * * * *